W. L. HALL.
METHOD OF MAKING PICTURES.
APPLICATION FILED DEC. 23, 1918. RENEWED JAN. 5, 1921.
1,372,811.
Patented Mar. 29, 1921.
3 SHEETS—SHEET 2.
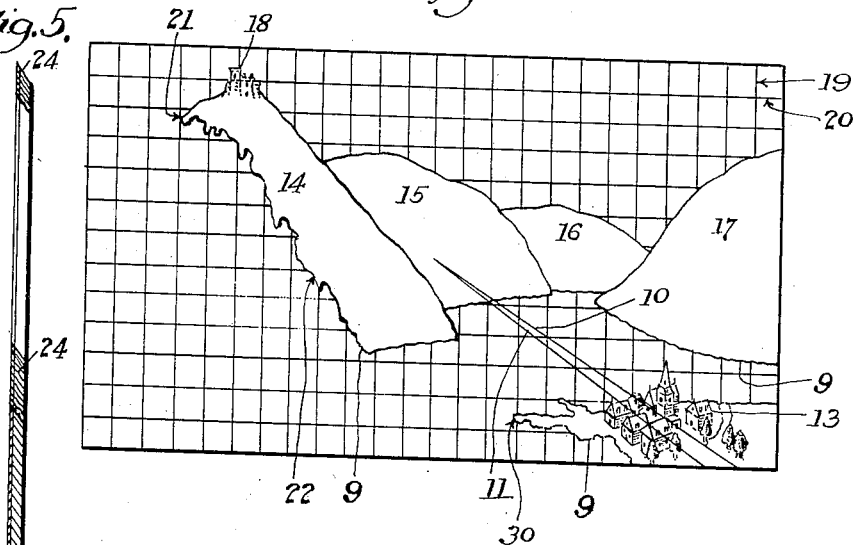
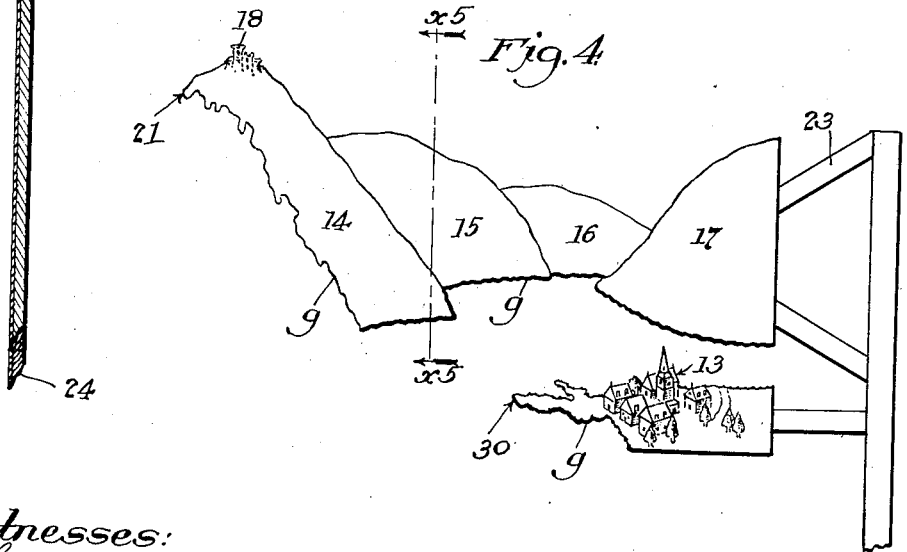
Witnesses:
Inventor:
Walter L. Hall.
By Frederick Whyon
Attorney W. L. HALL.
METHOD OF MAKING PICTURES.
APPLICATION FILED DEC. 23, 1918. RENEWED JAN. 5, 1921.
1,372,811.
Patented Mar. 29, 1921.
3 SHEETS—SHEET 3.
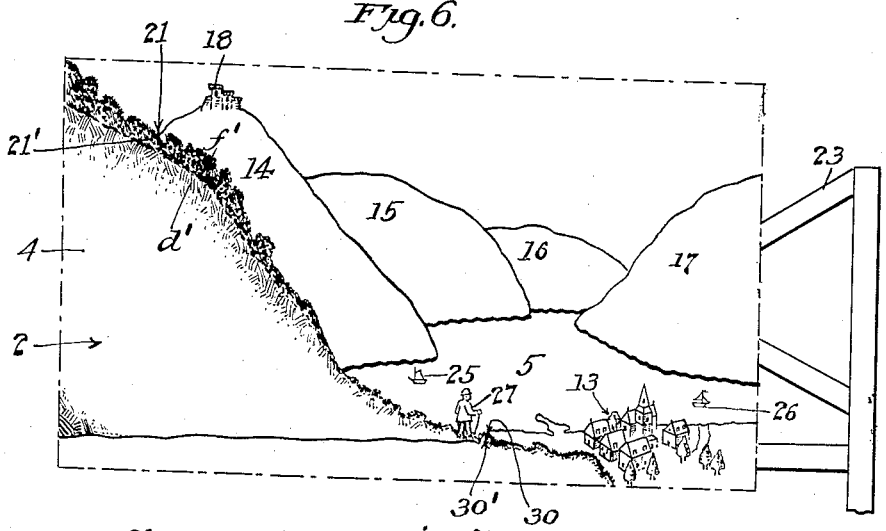
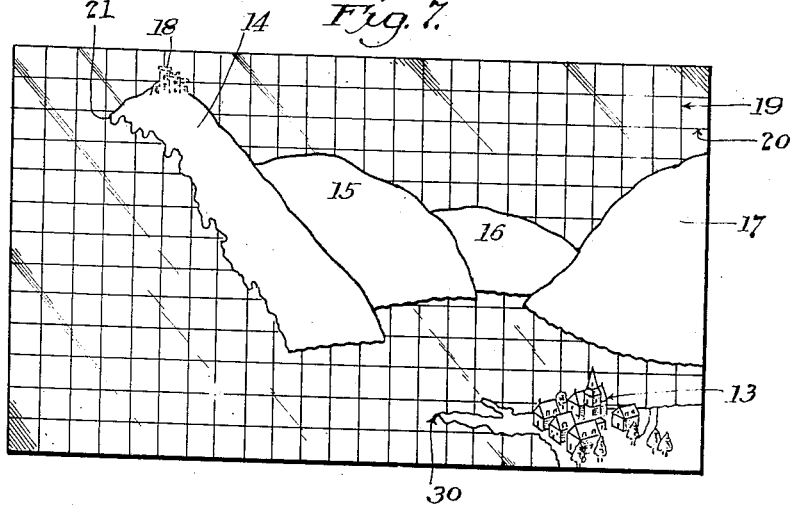
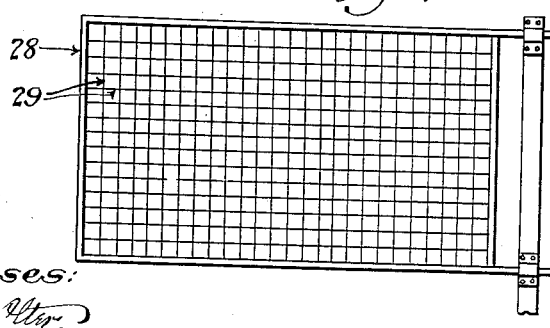
Witnesses:
Inventor:
Walter L. Hall.
By Frederick L. Ryan.
Attorneys

UNITED STATES PATENT OFFICE.

WALTER L. HALL, OF LOS ANGELES, CALIFORNIA.

METHOD OF MAKING PICTURES.

1,372,811.  Specification of Letters Patent.  Patented Mar. 29, 1921.

Application filed December 23, 1918, Serial No. 268,043. Renewed January 5, 1921. Serial No. 435,250.

*To all whom it may concern:*

Be it known that I, WALTER L. HALL, a citizen of Great Britain, residing at Los Angeles, in the county of Los Angeles, State of California, have invented a new and useful Method of Making Pictures, of which the following is a specification.

This invention relates to a method whereby the production of combination pictures is accomplished and the invention though applicable to the production of single pictures or views is especially useful in the moving picture art.

An important object of the invention is to reduce the expense of producing pictures in which the natural and the artificial are combined so as to make a scene appear to have been taken in a different place or at a different time than is actually the case.

An object of the invention is to so nicely combine a scene and a picture that the entire combination will appear as though actually existing *in toto* as the scene photographed.

Another object is to produce photographic pictures by a method that will enable the photographer to photograph a miniature and an actual scene simultaneously so that the miniature will appear to be in or upon the background of the view photographed instead of, as it is in reality, in the foreground.

Another object is to facilitate the production of the miniature in the various tones or colors of the scene which is to be photographed so as to give the proper illusion when viewing the finished picture.

Another object is to facilitate the drawing of the different objects in the miniature to a scale commensurate with the scale of that portion of the scene with which the miniature is to appear as being an integral part.

Another object is to make it possible to photograph scenes with action therein to the end that the finished picture will give the impression that the action is taking place in an environment entirely different than that in which the action actually did take place when the scene was photographed.

Another object is to facilitate the delineation of the marginal portions of the miniature or picture in conformity with the portions of the scene which, in the finished picture, lie adjacent the marginal portions of the miniature.

Other objects and advantages will appear from the subjoined detailed description.

The term "miniature" wherever used throughout my specification or claims is understood to refer to that class of objects which includes paintings, drawings, physical representations or other artificial replicas of every kind known and utilized in the art of photography and motion pictures.

The accompanying drawings illustrate the invention.

Fig. 3 is a view of a miniature painted or built by the artist on an opaque panel and adapted to fit into the scene shown in Fig. 1.

Fig. 4 is a view of the miniature shown in Fig. 3, the panel on which the picture is painted being cut away around the margins of the miniature and the miniature being shown mounted on a support.

Fig. 5 is an enlarged vertical section on line indicated by $x^5$—$x^5$, Fig. 4.

Fig. 6 is a representation of the scene shown in Fig. 1, as seen through the lens of the camera, but taken at a subsequent period of time, a portion of the support also being shown for supporting the painting in its predetermined position in the scene.

Fig. 7 is a representation analogous to Fig. 3, showing the miniature painted on a transparent panel.

Fig. 8 is a front elevation of a ruled transparent screen that may be employed in front of the camera when photographing a scene so as to produce on the finished picture the lines used in aiding the artist to correctly construct the outlines of the painting or miniature for blending the scene correctly with which the miniature is to be photographed.

Figure 1:
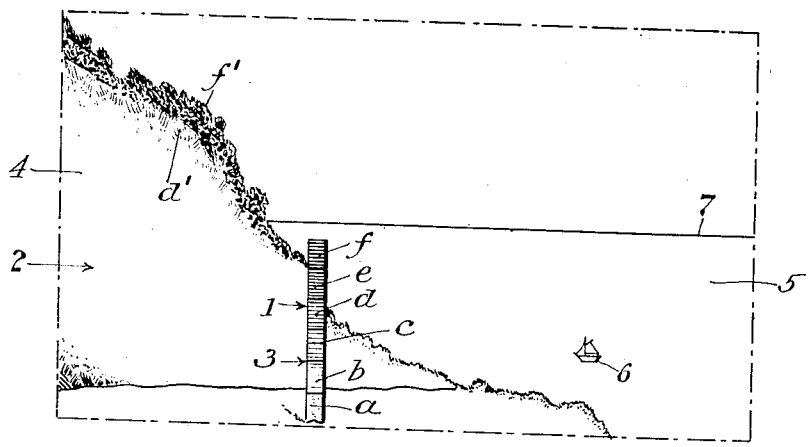
Figure 1 is a representation, as it appears viewed through the lens of a camera, of a scene or natural landscape, a part of which is to form the actual portion of the picture being produced.

In this new method of making pictures the photographer erects a target 1, as in Fig. 1, in the local scene 2 within the field of view of his camera, not shown. This target 1 may be of any desired shape and size and is placed at a known distance from the camera lens and acts as a location marker as will be hereinafter made clear. This target is provided with spaced division marks 3 and it is preferable to paint or otherwise color the spaces between the division marks 3 different tones or shades or colors to form a photographic tone scale. The distance from one of the division marks 3 to another one of said marks is known to the photographer. In Fig. 1 six different shades or tones are indicated at $a$, $b$, $c$, $d$, $e$ and $f$ and when the picture is taken some or all of the different shades on the target 1 will correspond with different tones or shades in the scene photographed. For instance in Fig. 1 it may be assumed for purposes of description that the tone $f$ corresponds with that indicated at $f'$ in the scene and the tone $d$ with that indicated at $d'$. In the scene shown in Fig. 1 the tones $f'$, $d'$, for example, may be assumed to be, in nature, shrubbery on the slope of a hillside indicated at 4. In this particular scene shown in Fig. 1 is a body of water which is indicated at 5, and the whole scene may be assumed to be a view overlooking a portion of the ocean and the adjacent shore. On the body of water 5 is shown a vessel indicated at 6 and the length of the hull or other portion of said vessel is known to the photographer. This vessel 6 is hereinafter designated by the term "perspective measure" and it is understood that said perspective measure may be any object whatsoever of which the length is known to the photographer making the picture. The function of this perspective measure will be set forth hereinafter. The horizon is indicated at 7.

Figure 2:
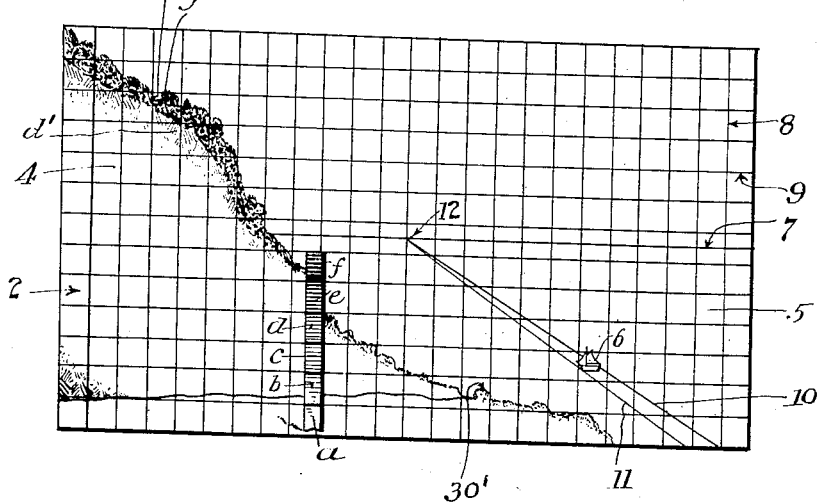
Fig. 2 is a representation of the picture taken by a camera of the scene shown in Fig. 1 and ruled for the guidance of the artist in making the miniature.

The photographer having set up the target, as above described, and the perspective measure being in the field of view or focal range of the camera, not shown, the photographer photographs the scene containing the target 1, a representation of this photograph being shown in Fig. 2 of the drawings. The position of this target 1 will be marked by suitable means, and the target may then be removed.

Having photographed the scene, Fig. 1, the photographer will make a positive in a manner well understood in the art pertaining to photography and he will rule the positive with construction lines 8, 9 and the spacing of said lines will be made to conform with the spacing of the division marks 3 on the image of the target 1 in the photograph. Also the photographer will draw lines 10, 11 from the vanishing point, indicated at 12 in Fig. 2, to opposite ends of the hull of the vessel and thence to the margin of the photograph. It is understood that the perspective lines 10, 11 may be drawn to the opposite ends of any portion of the vessel 6 or other perspective measure of which the length is known, for instance if the height of the mast of the vessel is known the lines 10, 11 can be drawn so as to touch the tip and base of the mast.

The next step in this newly invented method is the production of a suitable miniature of a scene foreign to the local scene depicting some of the objects it is desired to have appear as though really existing in the local scene to be pictured. The miniature may be a small scale model of objects desired to appear in the final picture or may be in the form of a picture painted or drawn or otherwise produced on a panel of any suitable material, for instance, on an opaque panel of compo board or other suitable material and a board backing therefor, as in Fig. 3, or glass or other transparent material, as in Fig. 7. In the instance shown, the miniature comprises a representation of a group of buildings 13, hills or mountains 14, 15, 16, 17 and a castle 18 on the summit of the hill 14. Before the miniature is drawn, construction lines 19, 20 will be drawn on the panel, as in Figs. 3 and 7, said lines corresponding to the lines 8, 9 respectively in Fig. 2, excepting that the spacing instead of being the same as for the lines 8, 9 will be some multiple of the spacing of the lines 8, 9. For instance, if the picture shown in Fig. 2 is four inches by six inches in size and it is desired to make the panel in Figs. 3 and 7 four feet by six feet, the panel will be just twelve times the size of the picture in Fig. 2, and consequently the spacing of the lines 19, 20 will be twelve times as great as the spacing of the lines 8 and 9. This difference of size cannot well be shown in the drawings, since Fig. 2 is practically a full size view, whereas Figs. 3 and 7 are greatly reduced views. For accuracy in drawings, other lines, not shown, may be used to divide the spaces between the lines 19 and 20 into still smaller spaces. These lines may run vertically and horizontally the same as 19 and 20 or may run diagonally if desired. By reason of the construction lines 19 and 20, the artist is enabled to exactly match up the marginal portions of the miniature with certain portions of the scene with which the miniature is to be photographed. For example, in the instance shown, it is determined to draw in the hills 14, 15, 16 and 17 and consequently he extends the lower end of the top line of the hill 14 downwardly to a predetermined point on the panel. This point is indicated at 21 in Fig. 3 and it corresponds in position with a point indicated at 21' in Fig. 2. This correspondence in positions of the points 21 and 21' is determined by the distance of said points from the adjacent lines 19, 20 and 8, 9 respectively. Also the left marginal line 22 of the hill 14 is accurately drawn so as to fit the outline of the shrubbery in the picture in Fig. 2 and this is possible because of the provision of the lines 8, 9, 19 and 20, to guide the artist's pencil and brush. The same is true of other portions of the miniature and it is not necessary to describe all of the instances in detail since the foregoing makes clear the manner in which the miniature is produced.

The graduations of tones $a$, $b$, $c$, $d$, $e$, $f$ on the target enable the artist to match with his colors different portions of the actual scene when painting the miniature so that the light and shade in the miniature will harmonize with that in the actual scene in order that when the final picture is subsequently made with the miniature showing therein as a part thereof said miniature will appear to form a distant part of the view and not appear to be in the foreground where it actually is when photographed. If he desires to have the tone $f'$, for instance, appear in the miniature he will look at the tone $f$ on the target and paint according to that tone or color.

In drawing, painting or building models of any objects such as the buildings 13 the artist is enabled to draw or construct them of appropriate size and in proper perspective because of the perspective construction lines 10, 11. For example, if the hull of the boat is forty feet long it is clear that said hull serves as a standard of measurement for all the objects to be painted or built in the miniature. In practice, the artist will measure horizontally between the lines 10, 11 at whatever level in the picture the portions of the objects to be drawn are desired to appear and it is clear that the nearer the front or foreground of the picture the objects are to be the larger they must be drawn. If the hull of the boat is known to be, for instance, forty feet long the artist can determine to a nicety how large to draw the buildings 13 since he can refer the dimensions of the buildings to the length of the hull by means of the perspective construction lines 10, 11. Even the doors and windows of the buildings can be drawn to the correct size in this manner so that the buildings will appear to take their places in the actual scene in the finished picture and not appear to be nearer the eye of the observer than those portions of the scene with which the miniature is adapted to merge perspectively.

After the miniature is drawn or painted, if on a non-transparent panel such as shown in Fig. 3, a suitable frame or support 23 will be provided and those portions of the panel outside of the margin of the miniature painted thereon will be cut away so that the finished miniature will have the appearance seen in Fig. 4.

In cutting away the unpainted portions of the panel at those marginal portions adapted to fit into and harmonize with certain portions of the actual scene shown in Fig. 1, irregularity of cutting is preferred, as clearly shown at $g$ in Fig. 4, so that as perfect blending as possible of the miniature margins with the actual scene will result. Also to prevent halation, when the picture is subsequently taken, which might be caused by reflection of light from the edges of the miniature, the edges are beveled rearward and inward as indicated at 24 so as to thin the edge to a mere line, thus causing any light rays reflected from the edges to be reflected rearward in such manner as to avoid the formation of a halo around the miniature when it is subsequently photographed.

After the miniature has been painted and mounted as above described or has been made in the form of small models of the various objects forming the miniature, the miniature and its frame 23 will be set up in the exact vertical plane formerly occupied by the target. The photographer will look through the camera at the miniature and have an attendant move the miniature to the right or left and up or down until the marginal portions thereof correctly register with those parts of the scene with which they were constructed to register, or until certain predetermined points on the miniature come into register with points in the scene which they have been made to fit, as, for instance, the point 21 into register with the point 21', and the point 30 with the point 30'. Then the camera will be set up on the exact marked spot occupied by it when the photograph shown in Fig. 2 was taken. The combined view as now seen through the lens of the camera is shown in Fig. 6.

It is clear from the foregoing that, when the miniature has thus been set up, the miniature will fit into the actual scene, viewed through the camera, in the precise manner in which the artist contemplated that it would when he conceived of the objects shown in the miniature and when he produced the miniature.

The photographer then proceeds with the exposure or exposures of the plates or film for the taking of the picture in a manner well understood in the photographic art and such picture may be a single view or may be a series of views to form a motion picture. Action may take place in the scene within certain limitations. In Fig. 6 the action is supplied by vessels 25, 26 and a man 27.

The advantage of this method of taking pictures can be readily comprehended for it is possible to make a painting, drawing or small model of comparatively simple and inexpensive construction to be used in lieu of the expensive construction of large buildings and other objects that at present are either constructed in more or less complete form or to secure which in the picture trips to distant regions are necessary by the company making the pictures. By this method it is possible to have action take place in a picture and seemingly locate the action in a foreign land or in an environment that has changed considerably in the years intervening between the period of time to be represented and that of actual photographing of the action.

If the miniature is produced on a transparent panel as in Fig. 7, it is clear that said entire panel will be set up in the position of the target 1 and that the unpainted portions of the panel will serve to support the painted portions the same as the frame 23 supports the miniature in Fig. 4.

Instead of the lines 8, 9 being drawn on the picture as in Fig. 2, a screen 28 of any transparent material, as shown in Fig. 8, may be set up in lieu of the target 1 so that when the scene is photographed the lines 29 of the screen will be photographed in place on the negative and will appear in the positive printed from said negative.

It is understood that the invention is not limited to the employment of the exact apparatus shown in the drawings and described above but that such changes and modifications may be made therein as properly fall within the spirit and scope of the appended claims.

I claim:

1. The method of making pictures which consists in placing a target having different color tones thereon in a scene lying within the field of view of a camera, photographing the scene with the target therein, comparing the color tones on the photographed image of the target with the color tones in certain portions of the photographed scene and noting which tones on the target correspond therewith, making a miniature having certain color tones corresponding with certain tones noted on the target, then placing the miniature thus made in the scene in place of the target, and simultaneously photographing the miniature and the portions of the scene not obscured by the miniature.

2. The method of making pictures which consists in placing a target having markings of known distance from one another thereon in a scene lying within the field of view of a camera photographing the scene with the target therein, ruling lines on the photograph with the spacing of said lines corresponding with the known distance between the markings on the image of the target in the photograph, ruling construction lines on a panel with the spacing of said lines a multiple of the spacing of the lines on the photograph, painting a miniature on the panel so that the outline thereof will coincide with certain predetermined positions on the photograph as determined by the lines on the panel, placing the miniature thus made in the scene in place of the target, and simultaneously photographing the miniature and the portions of the scene not obscured by the miniature.

3. The method of making moving pictures which consists in placing a miniature in the foreground of a scene lying within the field of view of a cinematographic camera, causing action to take place in the portions of the scene not obscured by the miniature, and making a series of photographic exposures of the miniature and the action and the portions of the scene not obscured by the miniature.

4. The method of making pictures which consists in photographing a scene having a perspective measure therein of which the length is known to the photographer, ruling perspective construction lines from the vanishing point in the photograph to opposite ends of the image of the perspective measure, making a miniature in which the sizes of the objects represented therein are determined by measuring horizontally between the perspective construction lines at whatever level in the picture the various portions of the objects to be represented in the miniature are desired to appear, placing the miniature thus made in the foreground of the scene within the field of view of the camera, and photographing the miniature and the portions of the scene not obscured by the miniature.

5. The method of making pictures which consists in photographing a scene having a perspective measure therein of which the length is known to the photographer, ruling perspective construction lines on the photograph from the vanishing point therein to opposite ends of the image of the perspective measure, ruling other perspective construction lines on a panel of a size that is a determined multiple of the size of the photograph, the last named perspective lines lying at the same angles as the first and being spaced according to the determined multiple, painting objects in the panel of a size determined by measuring horizontally between the perspective construction lines on the panel at whatever level in the picture the various portions of the objects to be represented in the miniature are desired to appear, placing the miniature thus made in the foreground of the scene within the field of view of the camera, and photographing the miniature and those portions of the scene not obscured by the miniature.

6. The method of making a picture which consists in producing a picture of objects on a smaller scale than said objects would be if located in the natural scene to be photographed and making said objects harmonize in tone and perspective with the parts of the scene where the objects are to appear as being located, placing the picture thus made in the foreground of the scene, and simultaneously photographing the picture and the portions of the scene not obscured by the picture.

7. The method of making moving pictures which consists in producing a picture of objects on a smaller scale than said objects would be if located in the natural scene to be photographed and making said objects harmonize in tone and perspective with the parts of the scene where the objects are to appear as being located, placing the picture in the foreground of the scene, causing action to take place in the portions of the scene not obscured by the picture, and making a series of photographic exposures of the picture and the action and the portions of the scene not obscured by the picture.

8. The method of making a composite photograph which consists in placing in the foreground of the local scene a miniature picture of a scene foreign to the local scene and corresponding in tone and perspective to that portion of the local scene obscured from the focal range of a camera by the miniature, and photographing the local scene and miniature simultaneously.

Signed at Los Angeles, California, this 12th day of December, 1918.

WALTER L. HALL.

Witnesses:
GEORGE H. HILES,
E. G. BLASDEL.